(12) United States Patent
Abou Saleh et al.

(10) Patent No.: US 11,202,340 B2
(45) Date of Patent: Dec. 14, 2021

(54) AUTO-CHANNEL SELECTION OF A WIRELESS ACCESS POINT

(71) Applicant: Alcatel Lucent, Nozay (FR)

(72) Inventors: Ahmad Abou Saleh, Antwerp (BE); Haris Gacanin, Antwerp (BE)

(73) Assignee: Alcatel Lucent, Nozay (FR)

( * ) Notice: Subject to any disclaimer, the term of this patent is extended or adjusted under 35 U.S.C. 154(b) by 176 days.

(21) Appl. No.: 16/311,078

(22) PCT Filed: Jul. 3, 2017

(86) PCT No.: PCT/EP2017/066429
§ 371 (c)(1),
(2) Date: Dec. 18, 2018

(87) PCT Pub. No.: WO2018/007284
PCT Pub. Date: Jan. 11, 2018

(65) Prior Publication Data
US 2020/0314962 A1    Oct. 1, 2020

(30) Foreign Application Priority Data
Jul. 6, 2016    (EP) .................................. 16290132.6

(51) Int. Cl.
*H04W 88/08*    (2009.01)
*H04W 24/02*    (2009.01)
(Continued)

(52) U.S. Cl.
CPC .......... *H04W 88/08* (2013.01); *H04W 24/02* (2013.01); *H04W 48/16* (2013.01);
(Continued)

(58) Field of Classification Search
CPC ..... H04W 84/12; H04W 24/02; H04W 88/08; H04W 72/0453; H04W 72/082;
(Continued)

(56) References Cited

U.S. PATENT DOCUMENTS 7,346,357 B1 *   3/2008   Kim ...................... H04W 16/04
                                                                    455/446
2004/0264475 A1 *  12/2004  Kowalski ................ H04L 47/28
                                                                    370/395.5
(Continued)

OTHER PUBLICATIONS

Search Report for corresponding European Application No. 16 290 132.6 dated Jul. 15, 2019.
(Continued)

*Primary Examiner* — Daniel Lai
(74) *Attorney, Agent, or Firm* — Harness, Dickey & Pierce, P.L.C.

(57) ABSTRACT

According to an embodiment, a wireless access point (AP) includes an auto-channel selector, a monitoring module, a performance index calculation module and a trigger module is disclosed. The auto-channel selector is configured to select a best performing channel of the AP; and the monitoring module is configured to obtain parameters exchanged with other APs; and the performance index calculation module is configured to derive one or more performance indices based on the parameters; and the trigger module is configured to trigger the auto-channel selector when one or more performance indices exceeds a threshold.

6 Claims, 5 Drawing Sheets

(51) Int. Cl.
*H04W 48/16* (2009.01)
*H04W 72/08* (2009.01)
*H04W 74/08* (2009.01)
*H04W 84/12* (2009.01)

(52) U.S. Cl.
CPC ..... *H04W 72/082* (2013.01); *H04W 74/0808* (2013.01); *H04W 84/12* (2013.01)

(58) Field of Classification Search
CPC ... H04W 16/10; H04W 72/085; H04W 88/12; H04W 28/08; H04W 72/06; H04W 72/1226; H04W 74/006; H04W 74/0808; H04W 92/20; H04W 36/06; H04W 72/042; H04W 74/0816; H04W 36/20; H04W 72/1231; H04W 24/04; H04W 72/00; H04W 72/0413; H04W 72/0426; H04W 72/10; H04W 72/1236; H04W 48/16; H04B 17/318; H04B 17/345; H04B 7/0417; H04L 41/0853; H04L 43/16; H04L 43/08; H04L 41/0823; H04L 47/125; H04L 41/0813; H04L 5/0062; H04L 5/0092; H04L 41/08; H04L 43/0811; H04L 5/0035; H04L 5/0073
See application file for complete search history.

(56) References Cited

U.S. PATENT DOCUMENTS

| | | | |
|---|---|---|---|
| 2005/0003827 A1* | 1/2005 | Whelan | H04W 16/10 455/454 |
| 2005/0070294 A1* | 3/2005 | Lyle | H01R 13/6461 455/452.2 |
| 2007/0076631 A1* | 4/2007 | Gupta | H04W 16/04 370/254 |
| 2008/0159210 A1 | 7/2008 | Zaks et al. | |
| 2010/0238871 A1* | 9/2010 | Tosic | H04W 16/10 370/329 |
| 2013/0003590 A1* | 1/2013 | Gage | H04W 52/244 370/252 |
| 2013/0316710 A1* | 11/2013 | Maaref | H04W 24/02 455/436 |
| 2015/0245364 A1* | 8/2015 | Yacovitch | H04W 24/10 370/329 |
| 2015/0327282 A1 | 11/2015 | Werner et al. | |
| 2017/0026970 A1* | 1/2017 | Pack | H04W 72/0426 |

OTHER PUBLICATIONS

International Search Report for International PCT Application No. PCT/EP2017/066429 dated Oct. 6, 2017.

* cited by examiner

AUTO-CHANNEL SELECTION OF A WIRELESS ACCESS POINT

CROSS-REFERENCE TO RELATED APPLICATIONS

This is application is a national phase under 35 U.S.C. § 371 of PCT International Application No. PCT/EP2017/066429 which has an International Filing Date of Jul. 3, 2017, which claims priority to European Application No. 16290132.6, filed Jul. 6, 2016, the entire contents of each of which are hereby incorporated by reference.

TECHNICAL FIELD

The present invention relates to the field of channel selection of a wireless access point.

BACKGROUND

A wireless access point, AP, operating according to the IEEE 802.11 Wi-Fi™ standard may exhibit performance loss caused by interference. Interference can originate from other APs or wireless devices in general that operate in the same or neighboring frequency bands. The performance loss typically results in a loss of bandwidth and higher power consumption.

A Wi-Fi™ AP can operate within a selection of channels each characterized by a certain frequency band. In order to optimize its throughput, an AP may select a channel in which it exhibits the least interference.

SUMMARY

A way to select the most optimal channel is through a channel algorithm which is triggered either after booting up of the AP or based on time period, for example automatically after the elapse of certain time period. The algorithm is provided with scanning results of the neighbourhood of the AP and based on these scanning results the channel with the potentially optimal bandwidth is determined by the channel algorithm. Consequently, by selecting the channel determined by the algorithm, the most effective performance of the AP is achieved.

However, since the algorithm is only triggered after booting up the AP or after a fixed time period, and since the environment is dynamically changing, it is a drawback that the AP has to be manually rebooted in order to trigger the algorithm again. Furthermore, triggering the algorithm based on a fixed time period might lead to false triggering conditions, for example when network performance is not degraded. This leads to a disruption of user connection without due cause.

It is therefore an objective of the present invention to alleviate the above drawback and to provide an improved solution for channel selection of a wireless AP.

This object is achieved, in a first aspect, by a wireless access point, AP, comprising an auto-channel selector configured to select a best performing channel; and a monitoring module configured to obtain parameters of signals or frames exchanged with associated devices (STAs); and a performance index calculation module configured to derive based on the parameters one or more performance indices indicative for a performance of the channel; and a trigger module configured to trigger the auto-channel selector when one or more of the performance indices exceeds a threshold.

Thus, the auto-channel selector of the AP is configured to select a best performing channel. This is done by for example an auto-channel selection algorithm which is provided with scanning results of the neighbourhood of the AP. After the auto-channel selector has selected a best performing channel is selected, the monitoring module will start again to scan the environment by obtaining parameters of signals or frames. These parameters are exchanged with STAs. Next, through a performance index calculation module, these parameters are used to derive one or more performance indices. These performance indices are indicative for a performance of the channel. Finally, when one or more of the performance indices exceeds a threshold, a trigger module will trigger the auto-channel selector in order to again select a best performing channel.

Since the environment of the AP is dynamically changing, a performance reduction can occur after the selection of a best performing channel by the auto-channel selector. It is therefore an advantage that the auto-channel selector can be triggered automatically without rebooting the AP when the network performance degrades. It is further an advantage that the triggering is performed by an objective parameter.

According to an embodiment, the parameters comprise at least one of the group of: received signal strength indications, RSSI, a retransmission rate, a failed packets rate, a channel utilization parameter, an activity factor, an idle timeout parameter, a noise level and a contention factor.

In other words, a multitude of parameters of signals or frames exchanged with STAs can be obtained.

RRSI levels are indicative for the strength of the signal between each STA and the AP.

A retransmission rate is indicative for the percentage of data packets that are retransmitted by the AP with respect to data packets sent.

A failed packets rate is indicative for the percentage of data packets that are not transmitted successfully after a predefined number of retransmission attempts.

A channel utilization parameter is indicative for the percentage of channel busy-time of the AP as indicated by either a physical or virtual carrier sense mechanism.

An activity factor is indicative for the percentage of time the channel is occupied by the AP's own activity.

An idle timeout parameter is indicative for the percentage of time the AP is unable to transmit or receive data packets to or from connected devices.

A noise level is indicative of the noise strength received at the AP. This measurement is made by sampling the channel when virtual carrier sense indicates idles and the AP is not transmitting or receiving a frame.

It is an advantage that a multitude of parameters may be used since not all parameters might be available in certain APs and/or at one certain moment in time. The auto-channel selector can in this way be triggered even when only one parameter is obtainable and a performance index derived therefrom exceeds a threshold.

According to an embodiment, the contention factor is the percentage of contending APs.

According to an embodiment, the monitoring module is further configured to classify neighboring APs in contending APs, non-interfering APs or hidden and interfering APs.

Thus by classifying neighboring APs, the environment of the AP is mapped. Next, the monitoring module calculates the percentage of contending APs, which equals to the contention factor.

A channel utilization parameter and/or an idle timeout parameter might be unavailable in certain STAs, or even in a worst-case scenario none of the parameters of the group of RSSI, a retransmission rate, a failed packets rate, a channel utilization parameter, an activity factor, an idle timeout parameter or a noise level are available. It is therefore an advantage that in this case, an auto-channel selector can still be triggered by the use of a contention factor.

According to an embodiment, a neighboring AP is a non-interfering AP when the neighboring AP operates in a frequency band which is at least a predefined number of frequency bands apart from a frequency band wherein the AP operates; and wherein a neighboring AP is a hidden and interfering AP when the neighboring AP operates in the same frequency band as that of the AP and wherein the RSSI level of the neighboring AP is not greater than a predefined carrier sensing threshold; or when the neighboring AP operates in a frequency band which is no more than a predefined number of frequency bands apart from a frequency band wherein the AP operates and wherein the difference between the RSSI levels of the neighboring AP and a predefined attenuation factor is not greater than a predefined energy detection threshold; and wherein a neighboring AP is a contending AP when none of the above conditions is fulfilled.

In other words, when a neighboring AP operates in a different frequency band as the frequency band used by the AP and the former band is at least a predefined number, for example five, apart from the latter band, then the neighboring AP is classified as a non-interfering AP.

If a neighboring AP operates in a same frequency band as wherein the AP operates and if the RSSI level of the neighboring AP is not greater than a predefined carrier sensing threshold, for example −82 dBm, the neighboring AP is classified as a hidden and interfering AP.

A neighboring AP can also be classified as a hidden and interfering AP if the neighboring AP doesn't operate in the same frequency band wherein the AP operates, but those bands are no more than a predefined number, for example five, of frequency bands apart from each other and the difference between the RSSI level of the neighboring AP and a predefined attenuation number is not greater than a predefined energy detection threshold, for example −62 dBm.

The predefined attenuation number can for example be dependent on the number of frequency bands situated between the frequency band wherein the neighboring AP operates and the frequency band of the AP. If the frequency bands are adjacent, the attenuation number can for example be 0.55 dB. When one frequency band is situated between the two, the attenuation number can for example be 2.46 dB. In the case of two frequency bands situated in between, the attenuation factor can for example be 6.6 dB, for three frequency bands in between them for example 34.97 dB and for the case of four frequency bands in between them an attenuation factor of for example 51.87 dB can be used.

Finally, a neighboring AP can also be classified as a contending AP. This is the case if the following two conditions are satisfied.

If a neighboring AP operates in a same frequency band as wherein the AP operates and the RSSI level of the neighboring AP is greater than a predefined carrier sensing threshold, for example −82 dBm, the neighboring AP is classified as a contending AP.

Otherwise, if a neighboring AP operates in a distinct frequency band as wherein the AP operates, but if those bands are no more than a predefined number, for example five, of frequency bands apart from each other and if the difference between the RSSI level of the neighboring AP and a predefined attenuation number is greater than a predefined energy detection threshold, for example −62 dBm, the neighboring AP is also classified as a contending AP.

The predefined attenuation number can be again dependent on the number of frequency bands situated between the frequency band wherein the neighboring AP operates related to that one of the AP and the same examples as for classifying a neighboring AP into a hidden and interfering AP can be used.

It is an advantage to use thresholds and factors because these thresholds and factors can be tuned according to a learning mechanism by, for example, the use of historical data.

According to a second aspect the disclosure relates to a method for triggering an auto-channel selector in a wireless access point, AP, the method comprising: selecting a best performing channel through the auto-channel selector; and obtaining parameters of signals or frames exchanged with associated devices (STAs); and deriving based on the parameters performance indices indicative for a performance of the channel; and triggering the auto-channel selector when one or more of the performance indices exceeds a threshold.

According to a third aspect, the disclosure relates to a computer program product comprising computer-executable instructions for performing the method according to the second aspect when the program is run on a computer.

According to a fourth aspect, the disclosure relates to a computer readable storage medium comprising the computer program product according to the third aspect.

According to a fifth aspect, the disclosure relates to a data processing system programmed for carrying out the method according to the second aspect.

DETAILED DESCRIPTION OF EMBODIMENT(S)

Figure 1:
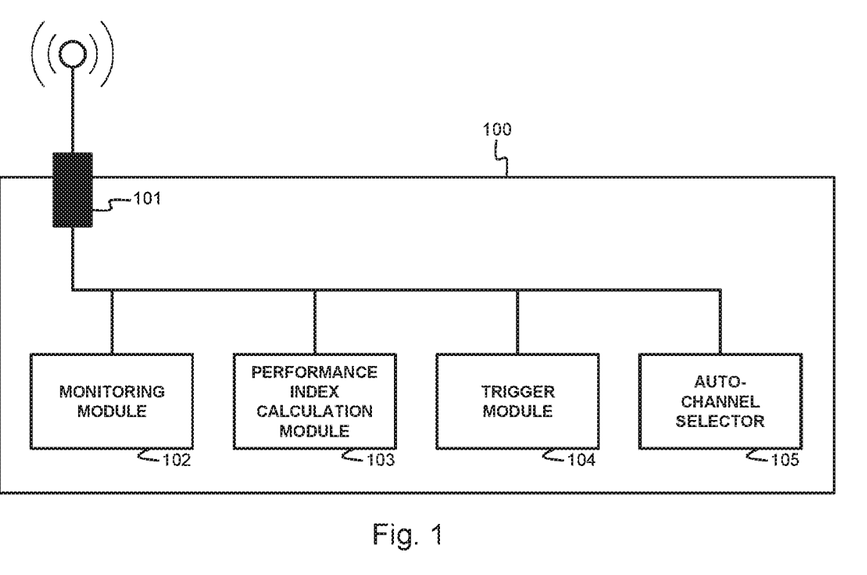
FIG. 1 illustrates an access point, AP, for channel selection of a wireless access point according to an embodiment of the invention.

According to an embodiment, the invention relates to an access point (AP) for selection of a wireless channel which can for example be used for a Wireless Local Area Network (WLAN). FIG. 1 illustrates such an AP 100, comprising a monitoring module 102, a performance index calculation module 103, a trigger module 104, an auto-channel selector 105 and a network interface 101. According to an embodiment, the auto-channel selector 105 is configured to select a best performing channel. This selection is performed by an auto-channel selection algorithm that is triggered after booting up the AP 100. Via the network interface 101, the auto-channel selector is provided with scanning results of the neighbourhood of the AP. As a result the auto-channel selector selects the channel with the potentially optimal bandwidth. Subsequently, by selecting this channel, the most effective performance of the AP is achieved.

Figure 2:
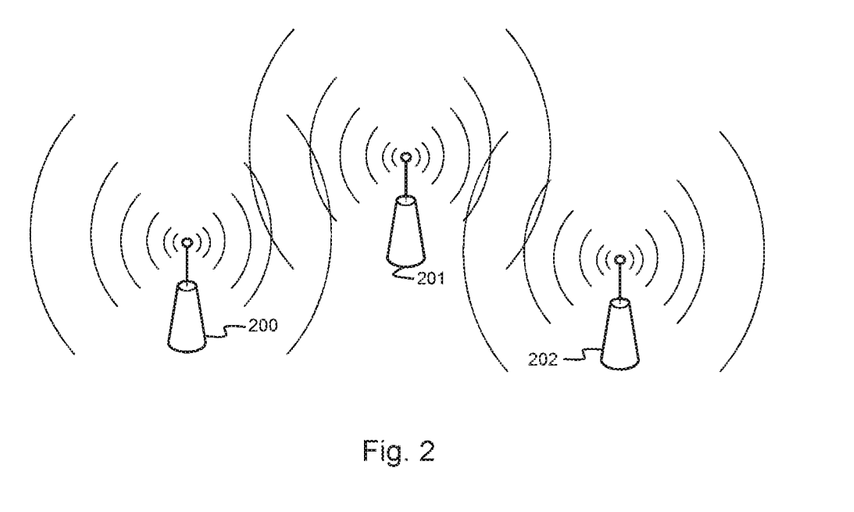
FIG. 2 illustrates a plurality of wireless access points operating in the proximity of other wireless access points or associated devices, STAs, according to an embodiment of the invention.

Wireless APs however usually operate in an environment wherein other APs or associated devices, STAs, also operate. FIG. 2 is an illustration of such an environment.

AP 201 is an AP 100 according to FIG. 1 and thus equipped with the auto-channel selector 105. Note however that other APs operating in the same environment, like AP 200 and AP 202, can also be equipped with an auto-channel selector. Since these APs 200 and 202 will also determine a channel with a potentially optimal bandwidth by use of their own scanning results, and since the instant of time wherein the auto-channel selector is triggered of each individual AP is not known is advance, the allocated channels are continuously changing.

Because of this dynamically changing environment, due to for example interference, a decreased performance of the AP 200 may occur, resulting in a loss of bandwidth and/or higher power consumption. Hence, the auto-channel selector 105 of the AP 100, 200 needs to be triggered again.

Figure 3:
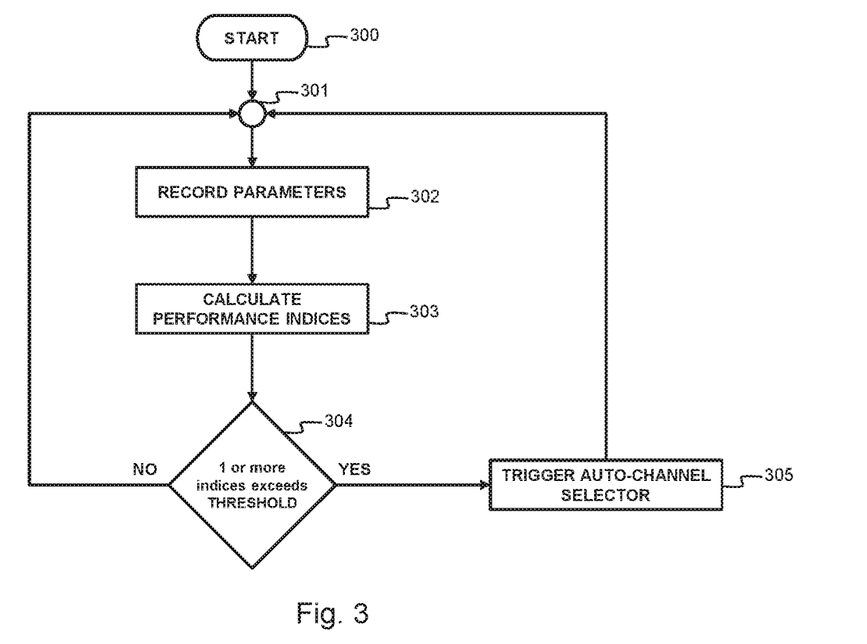
FIG. 3 illustrates steps performed by an access point to trigger an auto-channel selector according to an embodiment of the invention.

FIG. 3 represents the step that are performed in order to retrigger the auto-channel selector 105.

During operation of the AP 100, 201, the AP will start 300 to record in step 302 parameters of signal or frames. These parameters are exchanged with STAs. Next, the performance index calculation module 103 will calculate in step 303 one or more performance indices based on these parameters.

The calculated performance indices are indicative for the performance of the channel used by the AP 100, 201. The parameters may for example correspond to a received signal strength indications, RSSI, a retransmission rate, a failed packets rate, a channel utilization parameter, an activity factor, an idle timeout parameter, a noise level and a contention factor.

For each calculated performance index a threshold is defined, wherein the threshold may be dynamically changing and may be combined with other thresholds.

For example, the thresholds for the performance indices derived from RSSI levels, expressed in dBm, respectively a retransmission rate, expressed in percentages, can be mutually dependent. Hence, these thresholds may be set in ranges as follows:

RSSI>−33 dBm combined with a retransmission rate within 3% and 11%; and
−45 dBm<RSSI≤−33 dBm combined with a retransmission rate within 5% and 11%; and
−60 dBm<RSSI≤−45 dBm combined with a retransmission rate within 12% and 20%; and
−70 dBm<RSSI≤−60 dBm combined with a retransmission rate within 20% and 30%.

Performance indices derived from a channel utilization parameter respectively an activity factor, both expressed in the same unit, may also be combined by subtracting the former from the latter and defining a threshold for the outcome of this subtraction.

As for a performance index derived from a noise level, for example a signal-to-noise ratio, expressed in dB, the threshold may for example be set at 15 dB, wherein the threshold is exceeded when the performance index is below this value.

In a following step 304, a trigger module 104 monitors the performance indices with respect to the related thresholds. If one or more performance indices exceeds the threshold in step 304, an auto-channel selector 105 is triggered in step 305. Hence, a channel with a potentially optimal bandwidth is determined by the use of the auto-channel selection algorithm.

After the auto-channel selector is triggered, the steps are repeated again. If none of the thresholds are exceeded, the steps 302 to 304 are continuously repeated.

Figure 4:
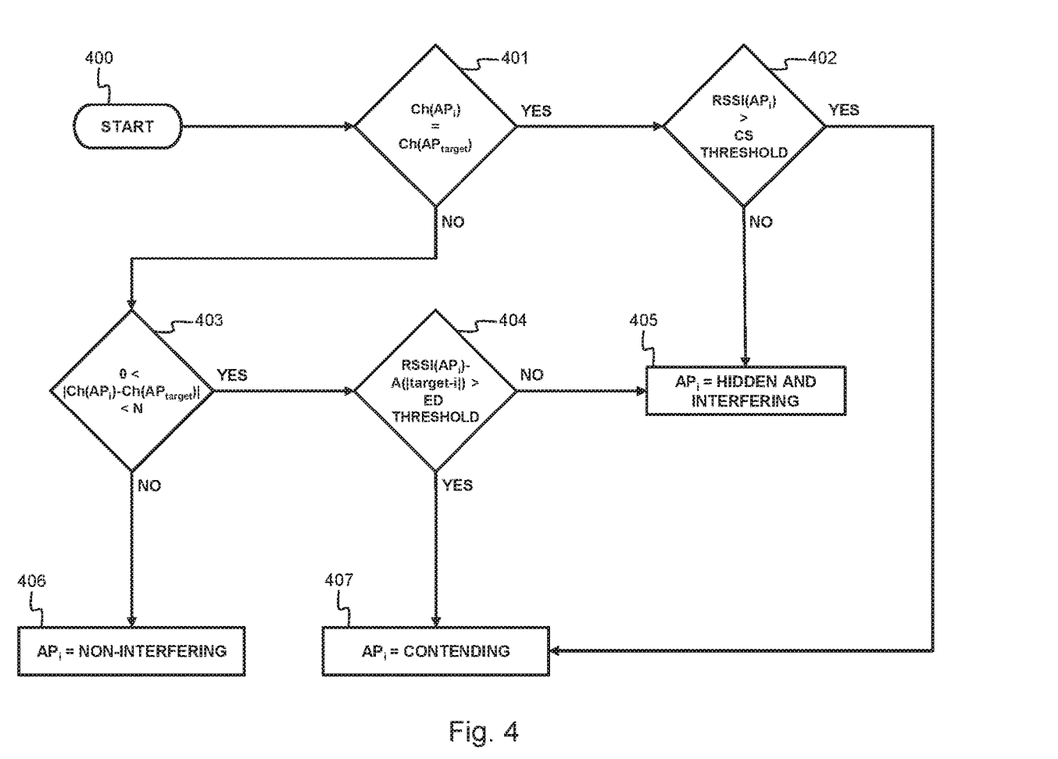
FIG. 4 illustrates steps performed by an access point to classify neighboring access points into non-interfering, contending or hidden and interfering neighboring access points according to an embodiment of the invention.

It may also occur that a parameter is unavailable. In this case, a contention factor may be used. This latter factor is calculated by classifying neighboring APs, like AP 200 and 202, in contending APs, non-interfering APs or hidden and interfering APs, wherein the contention factor is the percentage of contending APs. FIG. 4 represents the steps performed to classify the neighboring APs and hence how a contention factor can be calculated.

At the start 400, the method proceeds to step 401. Therein a neighboring AP is represented as $AP_i$ wherein the index i varies from 1 to n with n the total number of neighboring APs. AP 100, 201 is represented as $AP_{target}$. The frequency band in which the $AP_{target}$ 100, 201 operates indicated as $Ch(AP_{target})$ is compared with the frequency band in which the neighboring $AP_i$ operates, indicated as $Ch(AP_i)$. If the two frequency bands are the same, the RSSI level of the neighboring $AP_i$ is compared with a carrier sensing, CS, threshold in step 402. This threshold can for example be −82 dBm. If the RSSI level of $AP_i$ exceeds this threshold, the $AP_i$ is classified as a contending AP in step 407, if not, it is classified as a hidden and interfering AP in step 405.

In the case $Ch(AP_{target})$ and $Ch(AP_i)$ are unequal, the method proceeds to step 403 where the number of frequency bands situated between these two APs is determined. If this number of frequency bands exceeds a predefined number N, the $AP_i$ is classified as a non-interfering AP in step 406. N is for example set to five.

If the number of frequency bands between $Ch(AP_{target})$ and $Ch(AP_i)$ does not exceed N, a final test is performed in order to classify $AP_i$ in a contending AP in step 407 or in a hidden and interfering AP in step 405.

In step 404 a predefined attenuation factor $A_j$ is subtracted from the RSSI level of $AP_i$ wherein the factor $A_j$ depends on the number of frequency bands situated between $Ch(AP_{target})$ and $Ch(AP_i)$. This number is already determined in step 403. Hence, the total number of predefined attenuation factors equals the predefined number of frequency bands N used in this step 403. Subsequently, index j in the predefined attenuation factor $A_j$ equals to the number of frequency bands located between $Ch(AP_{target})$ and $Ch(AP_i)$.

According to an embodiment, for example if the number of frequency bands N used in step 403 is set to five, the following attenuation factors can for example be used to obtain a good result:

$A_0$=0.55 dB; and
$A_1$=2.46 dB; and
$A_2$=6.3 dB; and
$A_3$=34.97 dB; and
$A_4$=51.87 dB.

Thus, an attenuation factor Aj is subtracted from the RSSI level of APi. If the outcome of this subtraction does not exceed a predefined energy detection ED threshold, for example −62 dBm, APi is classified as a hidden and interfering AP 405. Otherwise, APi is classified as a contending AP 407.

As a result all the neighboring APs are classified in either a non-interfering AP 406, a contending AP 407 or a hidden and interfering AP 405. Next, a contention factor which equals to the percentage of contending APs is calculated and the performance index calculation module 103 will use this factor to calculate 303 a performance index. Hence, this performance index can be used to perform step 304.

Figure 5:
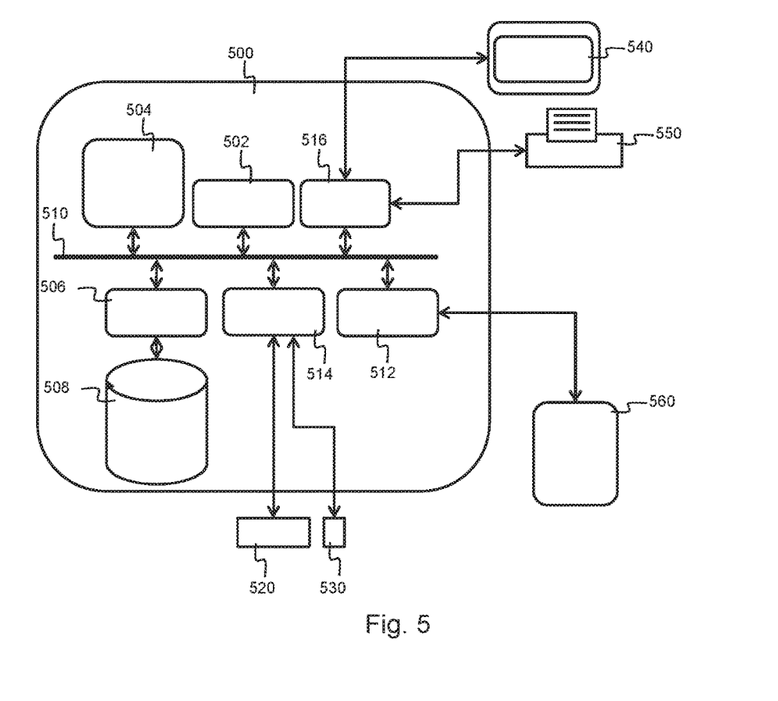
FIG. 5 illustrates a suitable computing system for performing steps according to various embodiments of the invention.

FIG. 5 shows a suitable computing system 500 for performing the steps according to the above embodiments.

Computing system 500 may be used as client device that runs the steps. Computing system 500 may in general be formed as a suitable general purpose computer and comprise a bus 510, a processor 502, a local memory 504, one or more optional input interfaces 514, one or more optional output interfaces 516, a communication interface 512, a storage element interface 506 and one or more storage elements 508. Bus 510 may comprise one or more conductors that permit communication among the components of the computing system 500. Processor 502 may include any type of conventional processor or microprocessor that interprets and executes programming instructions. Local memory 504 may include a random access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator to input information to the computing device 500, such as a keyboard 520, a mouse 530, a pen, voice recognition and/or biometric mechanisms, etc. Output interface 516 may comprise one or more conventional mechanisms that output information to the operator, such as a display 540, a printer 550, a speaker, etc. Communication interface 512 may comprise any transceiver-like mechanism such as for example one or more Ethernet interfaces that enables computing system 500 to communicate with other devices and/or systems 560. The communication interface 512 of computing system 500 may be connected to such another computing system by means of a local area network (LAN) or a wide area network (WAN) such as for example the internet. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage elements 508 above is described as a local disk, in general any other suitable computer-readable media such as a removable magnetic disk, optical storage media such as a CD or DVD, -ROM disk, solid state drives, flash memory cards, . . . could be used. The system 500 described above can also run as a virtual machine above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A wireless access point (AP) comprising:
 a processor configured to execute instructions to cause the wireless AP to,
  obtain parameters of signals or frames exchanged with associated stations (STAs), the parameters including a contention factor;
  obtain the contention factor by classifying neighboring APs as contending APs, non-interfering APs, or hidden and interfering APs;
  derive, based on the parameters, one or more performance indices indicating a performance of a channel in use by the AP; and
  trigger a channel selection algorithm to determine and select a best performing channel, in response to one or more of the performance indices exceeding a threshold,
 wherein a neighboring AP is a non-interfering AP when the neighboring AP operates in a frequency band which is at least a number of frequency bands apart from a frequency band wherein the AP operates,
 wherein a neighboring AP is a hidden and interfering AP when
  the neighboring AP operates in the same frequency band as that of the AP and wherein a received signal strength indication (RSSI) level of the neighboring AP is not greater than a carrier sensing threshold, or
  the neighboring AP operates in a frequency band which is no more than the number of frequency bands apart from a frequency band wherein the AP operates and wherein the difference between the RSSI levels of the neighboring AP and an attenuation factor is not greater than an energy detection threshold, and
 wherein a neighboring AP is a contending AP if it is neither a hidden and interfering AP nor a non-interfering AP.

2. The wireless access point according to claim 1, wherein the parameters comprise at least one of:
 received signal strength indications (RSSI);
 a retransmission rate;
 a failed packets rate;
 a channel utilization parameter;
 an activity factor;
 an idle timeout parameter; or
 a noise level.

3. The wireless access point according to claim 1, wherein the contention factor is a percentage of contending APs.

4. A method for triggering an auto-channel selector in a wireless access point (AP), the method comprising:
 obtaining parameters of signals or frames exchanged with associated stations (STAs), the parameters including a contention factor;
 obtaining the contention factor by classifying neighboring APs as contending APs, non-interfering APs, or hidden and interfering APs;

deriving, based on the parameters, performance indices indicating a performance of a channel in use by the wireless AP; and triggering the auto-channel selector to determine and select a best performing channel, in response to one or more of the performance indices exceeding a threshold, wherein a neighboring AP is a non-interfering AP when the neighboring AP operates in a frequency band which is at least a number of frequency bands apart from a frequency band wherein the AP operates, wherein a neighboring AP is a hidden and interfering AP when
- the neighboring AP operates in the same frequency band as that of the AP and wherein a received signal strength indication (RSSI) level of the neighboring AP is not greater than a carrier sensing threshold, or
- the neighboring AP operates in a frequency band which is no more than the number of frequency bands apart from a frequency band wherein the AP operates and wherein the difference between the RSSI levels of the neighboring AP and an attenuation factor is not greater than an energy detection threshold, and wherein a neighboring AP is a contending AP if it is neither a hidden and interfering AP nor a non-interfering AP.

5. A non-transitory computer readable storage medium storing computer-executable instructions, which when executed by a processor, cause the processor to perform the method of claim 4.

6. A data processing system programmed for carrying out the method according to claim 4.

* * * * *